(12) United States Patent
Farquhar

(10) Patent No.: US 10,836,444 B2
(45) Date of Patent: Nov. 17, 2020

(54) REAR BODY STRUCTURE FOR VARYING THE SHAPE OF COMMERCIAL TRAILERS AND TRUCKS

(71) Applicant: UNIVERSITY OF MARYLAND, BALTIMORE COUNTY, Baltimore, MD (US)

(72) Inventor: Tony Farquhar, Catonsville, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 109 days.

(21) Appl. No.: 16/174,809

(22) Filed: Oct. 30, 2018

(65) Prior Publication Data

US 2019/0126996 A1   May 2, 2019

Related U.S. Application Data

(60) Provisional application No. 62/578,637, filed on Oct. 30, 2017.

(51) Int. Cl.
*B62D 35/00* (2006.01)

(52) U.S. Cl.
CPC ......... *B62D 35/002* (2013.01); *B62D 35/001* (2013.01)

(58) Field of Classification Search
CPC ............................ B62D 35/002; B62D 35/001
USPC ...................................................... 296/180.4
See application file for complete search history.

(56) References Cited

U.S. PATENT DOCUMENTS

| | | | |
|---|---|---|---|
| 3,945,677 A * | 3/1976 | Servais | B62D 35/004 296/180.2 |
| 4,257,641 A | 3/1981 | Keedy | |
| 4,433,865 A | 2/1984 | Crompton, Jr. | |
| 4,458,937 A * | 7/1984 | Beckmann | B62D 35/001 296/180.3 |
| 4,462,628 A * | 7/1984 | Gregg | B62D 35/001 296/180.3 |
| 4,601,508 A | 7/1986 | Kerian | |
| 4,682,808 A | 7/1987 | Bilanin | |
| 5,332,280 A | 7/1994 | DuPont et al. | |
| 5,375,903 A | 12/1994 | Lechner | |
| 5,498,059 A | 3/1996 | Switlik | |
| 6,257,654 B1 | 7/2001 | Boivin et al. | |
| 6,286,894 B1 | 9/2001 | Kingham | |
| 6,309,010 B1 | 10/2001 | Whitten | |
| 7,207,620 B2 | 4/2007 | Cosgrove et al. | |
| 8,287,030 B2 | 10/2012 | Ryan et al. | |
| 8,444,210 B2 * | 5/2013 | Domo | B62D 35/001 180/903 |
| 9,834,262 B2 * | 12/2017 | Baker | B62D 35/001 |
| 9,896,138 B2 * | 2/2018 | De Bock | B62D 35/007 |
| 2004/0119319 A1 * | 6/2004 | Reiman | B62D 35/004 296/180.1 |
| 2008/0309122 A1 | 12/2008 | Smith et al. | |

(Continued)

*Primary Examiner* — Pinel E Romain
(74) *Attorney, Agent, or Firm* — Marianne Fuierer; Olive Law Group, PLLC

(57) ABSTRACT

The present invention relates to an air deflector configuration that can be fabricated into the construction of a new truck or trailer container or secured to the rear face of a flat rear box-like end of trucks and trailers as an attachment, with the aim of reducing aerodynamic resistance and correspondingly the fuel consumption of land vehicles used for the transportation of such containers.

34 Claims, 18 Drawing Sheets

(56) References Cited

U.S. PATENT DOCUMENTS

| | | | |
|---|---|---|---|
| 2009/0200834 A1* | 8/2009 | Vogel | B62D 35/001 296/180.3 |
| 2011/0272964 A1 | 11/2011 | Henderson et al. | |
| 2015/0239512 A1* | 8/2015 | Smith | B62D 35/001 296/180.4 |

* cited by examiner

REAR BODY STRUCTURE FOR VARYING THE SHAPE OF COMMERCIAL TRAILERS AND TRUCKS

CROSS-REFERENCE TO RELATED APPLICATION

The present invention claims priority to U.S. Provisional Application No. 62/578,637 filed on Oct. 30, 2017, the contents of the application is hereby incorporated by reference herein for all purposes.

BACKGROUND OF THE INVENTION

Field of the Invention

The invention relates to an air flow management configuration that can be integrated into the rear roof and side walls of a bluff-bodied or box-like cargo container at the time of manufacture, or fitted at a later time as an integrated attachment, with the aim of improving the aerodynamic streamlining and hence reducing the fuel consumption of the vehicle used to haul such a container.

Related Art

It is well-known in the prior art that considerable drag is induced by the reduced pressure acting on the base or blunt rear end of commercial trucks and trailers, particularly when they are operated at speeds exceeding 55 miles per hour. When such vehicles are operated on long hauls over considerable distances, the portion of the fuel consumed due to the tail drag created by the blunt rear end of the vehicle represents a significant operational cost with a direct impact on transportation rates and profitability.

This problem, however, is not limited to the road freight industry. The railroads, in an effort to compete with the trucking industry, have resorted to use of piggyback railroad cars to transport trailers and cargo containers, also at relatively high speeds. The trailers and cargo containers transported on specially designed articulated railroad cars for the trailer or flatbed cars for the cargo containers present the same problem faced by the trucking industry with respect to drag during relatively high speed movement and subsequent fuel consumption.

The dimensions and capacities of heavy commercial vehicles especially including North American Class 7 tractor trailers is regulated by federal and state laws to ensure that they can be safely operated on public highways. As a general statement, the road freight transport industry must operate with low profit margins and is particular sensitive to the costs of cargo loading/unloading, driver salary and fuel consumption. The double swinging doors at the rear end of a standard commercial box trailer are therefore intended to facilitate rapid access to the cargo space with little consideration given to aerodynamic performance. In recent times, various air deflectors and the like have been provided to improve the aerodynamic efficiency of the tractor, to reduce the 'gap', and to exclude flow from underneath the trailer. Foldable tails (e.g., STEMCO's TrailerTail) are also available but have not been widely accepted by the trucking industry due to perceived negative impacts on driver labor, cargo access, and on-highway safety. While various means have been proposed in the prior art to address this problem, all have limitations and none have so far gained universal acceptance, if any. According to a recent federal study, the vast majority of bluff-bodied commercial trucks and trailers (>97%) are being hauled on U.S. roads without regard to the associated tail drag.

It is an object accomplished by this invention to provide improved means to reduce the pressure drag acting on the vertical rear wall at higher speeds, in a bluff-bodied road vehicle, such as a Class 5 or 6 box truck, or a Class 7 dry van trailer, or a box-shaped recreational vehicle, or the like.

SUMMARY OF THE INVENTION

The invention consists of a variable configuration rear body structure that can be integrated into the standard construction of a new truck or trailer or as an alternative can be pre-assembled in kit form and later installed into a pre-notched existing box trailer, in either case resulting in a functionally superior cargo vehicle, as evidenced by 1) lower fuel consumption at highway speed, and 2) easy cargo access via either one of two alternative doorways.

In one aspect, the present invention provides for a truck or trailer with an air flow management configuration that can be used to shape the flow over the rear end of the truck or trailer, wherein the means of air deflection relies on an inward and downward folding of the rear roof and upper side-walls of the truck or trailer, over the last 8 or so feet of the rear end, with a varying degree of inward and downward angulation of the exterior surfaces of the cargo container walls, and wherein the panels comprising the upper rear end of the truck or trailer are primarily comprised of a simply hinged flat roof (top) panel and two (left vs right) multiply-hinged sides panel, and wherein the roof panel is secured so that it can be rotated down from the horizontal to the optimal downward angulation and is lateral supported by hinged connections to the two inwardly folding side panels.

The hinging roof panel is to be set with a slope of 10 to 20 degrees, preferably about 14 to 15 degrees relative to the plane of the top surface of the truck or trailer, to provide for the most beneficial redirection and shaping of the air flow near the rear of the vehicle when the truck or trailer is moving at highway speeds. In conjunction, the folding upper sidewall panels are configured to be folded inward in such a way that they form two expanding v-shaped channels that serve to direct air flow into the base region under the roof panel, with a preferred maximum width and depth of these channels at the rear doors of 14" and 17", respectively. Further, access to the back end of the truck or trailer is provided by two man-height doors, hinged on the vertical door posts of an internal frame, and able to open outward up to 270 degrees so that they can be secured back against the cargo container walls. In another possible realization, a rolling door or weather tight curtain or other means is provided to seal the inclined opening beneath the rear roof, so as to provide provision for protecting and securing the cargo when the double swinging doors are locked in the closed position.

Still further, the roof panel and the two sidewalls of the truck or trailer are communicatively connected by multiple foldable hinges that facilitate easy raising and lowering of the roof panel to best suit the operating conditions.

In yet another aspect the present invention incorporates two hinged triangular assemblies of two panels each and comprising weather-tight foldable mechanisms that replace the upper rear sidewalls of a standard cargo container, wherein the component triangular pieces are sized and hinged in such a manner wherein the resulting assembly can be folded between an open generally coplanar configuration and an alternative configuration that provides the desired aerodynamic sloped form. Notably the airflow and the pressure in the space behind the cargo container is thereby altered and this serves to improve the aerodynamic characteristics thereof.

Importantly in the closed or collapsed position, two rigid triangular pieces of the triangular panel which are hinged together thereby allowing for the inward folding of the two ridged triangular pieces which defines an end space therebetween. Notably the end space is a dead space area which provides increased pressure in the region behind the moving body to delay separation of the airflow and improve the aerodynamic characteristics of the vehicle thereof.

In a still further aspect, the present invention provides for an air deflector unit that is an open ended box like container, open ended on one end for attachment to the end of a truck or trailer. The unit is constructed of two side panels, a bottom panel, a rear panel and a top panel, wherein the upper edge of each of the two side panels is sloped at an angle in a range from about −7 to −20 degrees relative to the plane of the top surface of the truck or trailer. The top panel is configured on a hinge mechanism to open and close and when in a closed position rests on the rear panel and sloped side panels of the unit having a slope corresponding to the approximate slope of the two side panels. The closed top panel, with a preferred slope of about −10 degrees relative to the plane of the top surface of the truck or trailer, provides for redirection of wind flow down the sloped angle when the truck or trailer is moving. Further, the unit provides for access to the back end of the truck or trailer through two lower doors, positioned in the rear panel of the unit, that open outward and accessible when the top panel is in either the open or closed position. A third opening is available when the top panel is in an open position and the two lower doors are open. This provide for access to the full height of the truck or trailer storage/cargo area.

Still further, the top panel and each of the side panels are communicatively connected by a triangular foldable panel that actuates the opening and closing of the top panel. The top panel in a closed state, slopes away from the truck and towards the road thereby providing for directional movement of air flow to the back of the unit as the truck or trailer is moving.

In yet another aspect the present invention provides a triangular panel composed of two similar left and right rigid triangular pieces, wherein the triangular pieces are hinged together so as to be movable between an open generally coplanar position and a closed position thereby allowing for the inward folding of the two ridged triangular pieces which defines an end space therebetween. Notably the end space is a dead space area which provides a low pressure area in the rear of the moving body to direct airflow and improve the aerodynamic characteristics thereof.

The present invention provides for a lightweight folding rear body structure that can be pre-assembled and later installed on an existing 53' trailer, or any box-like truck in one day. The major components of the unit are comprised a rigid frame that can be installed and sealed into a pre-notched existing truck or trailer body.

The unit comprises a hinged top panel or flap attached or communicatively connected to the rear part of the truck or trailer, wherein the top panel or flap projects back into the near-wake and is attached to two (left and right) upper sidewalls each comprised of rigid foldable triangular panels whose inward motion can accommodate the variable inclination of the hinged top panel or flap, and wherein two v-shaped channels are established under the sloping hinged roof panel and serve to direct jet flows into the base region, two 6.5' high side-hinged vertical doors with deployable side flaps to provide a further means of trimming the air flow past a vehicle operating under cross wind conditions, and a single 3' high top-hinged vertical door that can either be stowed up under the roof or can be swung down to seal the cargo space in the raised configuration by engaging and securing the upper edge of the double doors. In the alternative a single 8' long front-hinged inclined door that can also be stowed up under the top panel or flap or can be swung down to seal the cargo space by engaging and securing the upper edge of the double doors, plus various sub-systems needed to secure, lock, and/or actuate the afore-mentioned major components.

The present invention provides for an air flow management system to be incorporated into a box-shaped vehicle truck or trailer, wherein the squared-off rear end is replaced with inward and downward folding cargo container walls, plus supplemental features, as shown and discussed below.

These and other features of the invention to be more fully understood by reference to the following drawings.

DETAILED DESCRIPTION OF THE INVENTION

Figure 1:
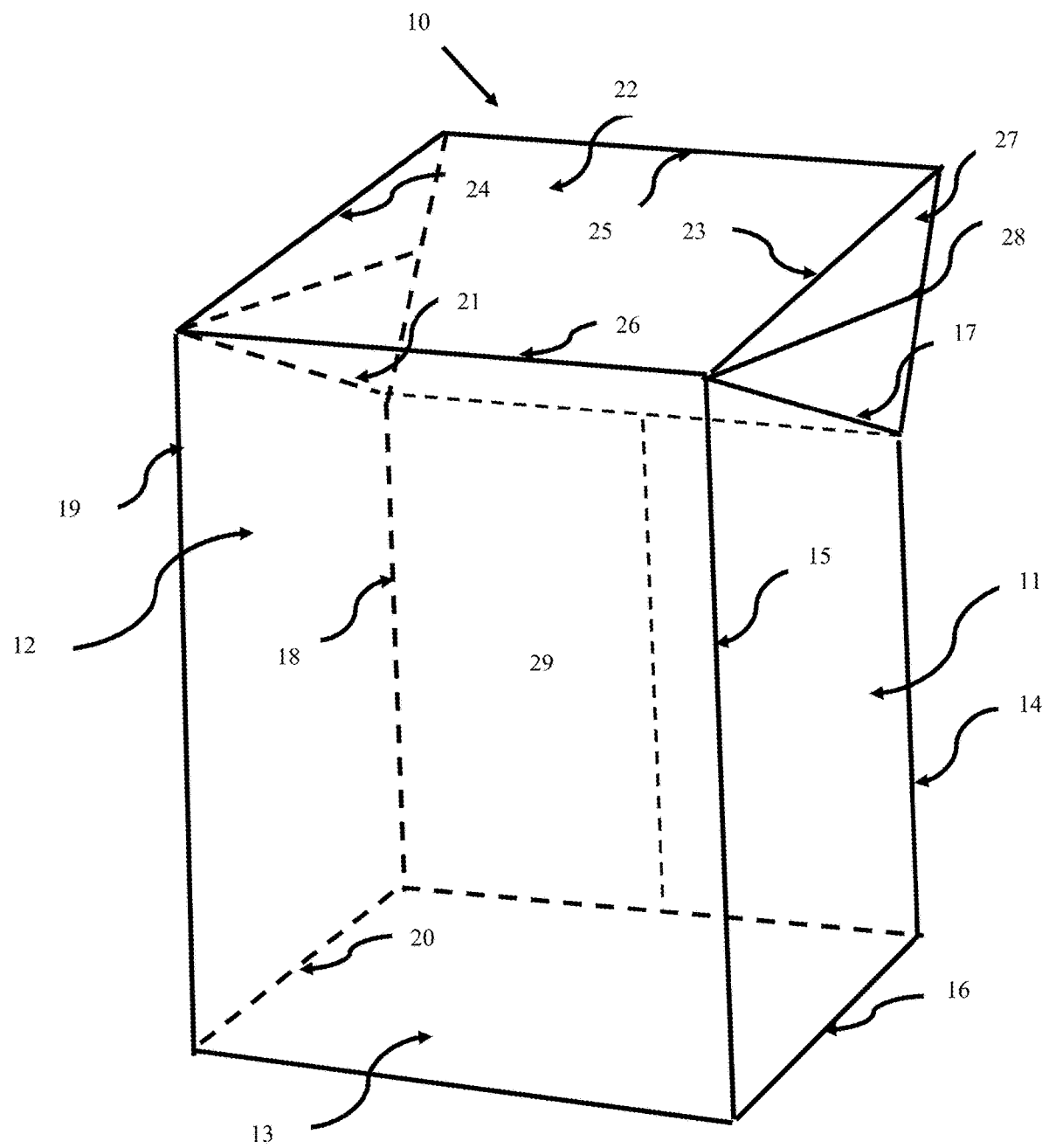
FIG. 1 shows the unit in a raised configuration of the top panel with specific description of the construction parts.

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure is generally directed to an air-deflection extension unit and methods for reducing vehicle drag caused by vehicle trailers. In this regard, the term vehicle can refer to any type of vehicle. In particular, however, the present disclosure specifically contemplates use with heavy trucks, such as tractors and trailers connected thereto. The present disclosure identifies key areas in which modifications to conventional trailers can result in great reductions in vehicle drag, which can translate into improved fuel economy, reduced emissions of carbon dioxide, as well as other improved efficiencies.

It will then be appreciated that the design of aerodynamic modifications which are practical for use on commercial trailers and the like involves a careful selection of sensitive design parameters and the consideration of the various competing constraints imposed by legal regulation, trucking industry standards, compatibility with warehouse practices, highway safety, and customer demand. Clearly, it is desirable to limit the extension of any such modification to a minimum distance behind the rear doors, to comply with federal regulations on overall vehicle length, to minimize traffic hazards, to improve vehicle performance, to facilitate dockside parking, and to provide for cost-effective repair using standard materials and processes in case of damage. On the other hand, the dimensions and construction of the aerodynamic modifications must be sufficiently large and robust to achieve effective drag reduction and practical durability, respectively.

The present invention which includes the modification of a truck or trailer, such as a 53' long box trailer by en bloc installation of a rear body unit into a suitably notched existing standard trailer, which results in a superior commercial cargo vehicle, can be alternately configured for a) weather-tight secure storage, or b) dockside cargo handling, or c) curbside package transfer, or d) efficient reduced drag operation at highway speeds.

An object of this invention is to devise a rear body structure that can alternatively be configured to provide a) a secure rear door system, b) a full height doorway for forklift access, c) a man height doorway for hand loading single packages, and d) superior streamlining and reduced drag at highway speed, all without negatively impacting freight handling, driver workload, traffic safety, and compliance with legal statutes.

The invention consists of a variable configuration rear body structure that can be assembled as a unit and later installed into a pre-notched existing box trailer, resulting in a functionally superior cargo vehicle, as evidenced by 1) lower fuel consumption at highway speed, and 2) easy cargo access via either one of two alternative doorways.

As described above, FIG. 1 provides for a description of the construction parts for the unit of the present invention. The air deflector unit (10) is secured to and extends rearwardly from a truck or trailer, wherein the truck or trailer has a flat-box trailing end, a right and left sidewall surface, a top surface, and a lower or frame surface. The air deflector unit (10) comprises:

a. a first vertical side panel (11) and a second vertical side panel (12) attached to a bottom horizontal panel (13) for connection to the left and right sidewall surface and the lower or frame surface of the truck or trailer; wherein the first vertical panel (11) is configured having a first (14) and second vertical edge (15), a bottom horizontal edge (16) and a slopped top edge (17) with a slope in the range of about −7 to −20 degrees from the plane of the top surface of the truck or trailer, more preferably about 10 degrees, spanning from the first vertical edge (14) to the second vertical edge (15), wherein the second vertical panel (12); is configured having a first (18) and second vertical edge (19), a bottom horizontal edge (20) and a slopped top edge (21) with a slope of about −7 to −20 degrees, more preferably about −14 to 15 degrees and spanning from the first vertical edge (18) to the second vertical edge (19);

b. a top panel (22) having a first (23) and second side edge (24), front edge (25) and back (26) edge and communicatively connected to the top surface of the truck or trailer, wherein the top panel is pivotally movable between a collapsed position adjacent to the sloped top edge of the first vertical edge (17) and second vertical edge (21) and a deployed position extending upwardly generally parallel to the top surface of the truck or trailer edge to provide an opening the height of the truck or trailer;

c. a first foldable triangular panel (27) positioned and connected between the first side edge of the top panel (23) and with the slopped top edge of the first vertical panel (17), a second foldable triangular panel (28) positioned and connected between the second side edge of the top panel (24) and with the slopped top edge of the second vertical panel (21), wherein the first and second foldable triangular panels provide for the movement between the collapsed position and upward position of the top panel (22) and redirects wind flow to the back of the air deflector unit in a collapsed position; and d. an end panel (29) comprising two doors attached to the first vertical edge (14 and 18) of the first (11) and second (12) side panels, wherein the height of the two doors is that of the height of the first vertical edge of the first (11) and second (12) side panels and wherein the front edge (25) of the top panel (22), in the collapsed position, is adjacent to the end panel (29).

Accordingly, the inward folding of the triangular panels (27) and (28) is devised in a way that allows the hinged top panel (22) to be lowered −10 degrees, in a manner that has been shown experimentally at ⅓₅₃ scale, and by Reynolds averaged numerical simulation (RANS), to redirect a portion of the overlying flow downwards into the near wake, in a way that helps delay separation and inhibit turbulent recirculation, thereby reducing total drag on a trailer hauled at >25 m/s. The inward folding of the upper triangular panels is devised to form two expanding side channels that form shaped jet flows into the base. Additionally, the inward folding of the triangular panels is devised in such a way to delimit and confine a shaped cavity under the hinged top panel and above a sloping door, in a way that favorably increases base pressure, so as to reduce total drag on a trailer hauled at >25 m/s.

Moreover, in the raised state, the full-height doorway can be closed and secured by two vertical-hinged swinging doors plus a single top-hinged vertical door (stowed under roof). Further, when the top panel is in the lowered state, the man-height doorway can be closed and secured by the action of two vertical swing doors plus a front-hinged sloping door (also stowed under top panel).

Figure 2:
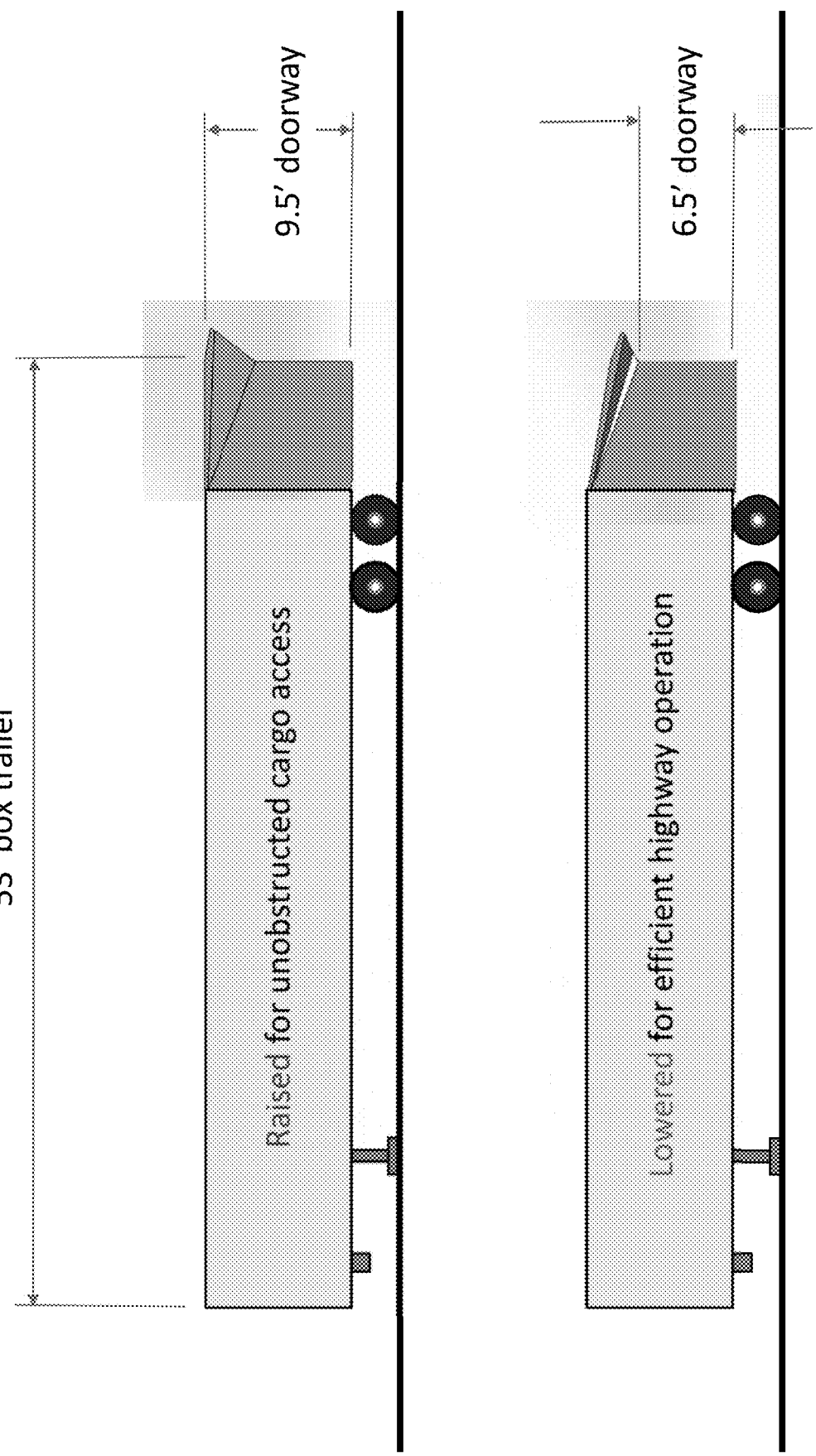
FIG. 2 shows the modified box trailer configured in two states, i.e., 'Raised' or 'Lowered'.

FIG. 2 shows the modified box trailer wherein the configured in two states, i.e., 'Raised' or 'Lowered'. The trailer can be hauled at any legal speed in either condition, and the cargo is always protected but easily accessible via full-height or man-height doorways, respectively. Rigid fastback shapes have been used in passenger vehicles but a design claim based on appearance as realized in a variable state commercial cargo vehicle is possible. Even so, the usefulness of the present invention arises from its ability to vary streamlining, either by selecting between the two states as shown here, or by varying shape over a range. In the present invention, varying cargo box shape is a non-obvious function that is only useful because the two states chosen also address a host of constraints imposed by aerodynamics, cargo access, traffic safety, ease of use, dimensional limits, and cargo security.

Figure 3:
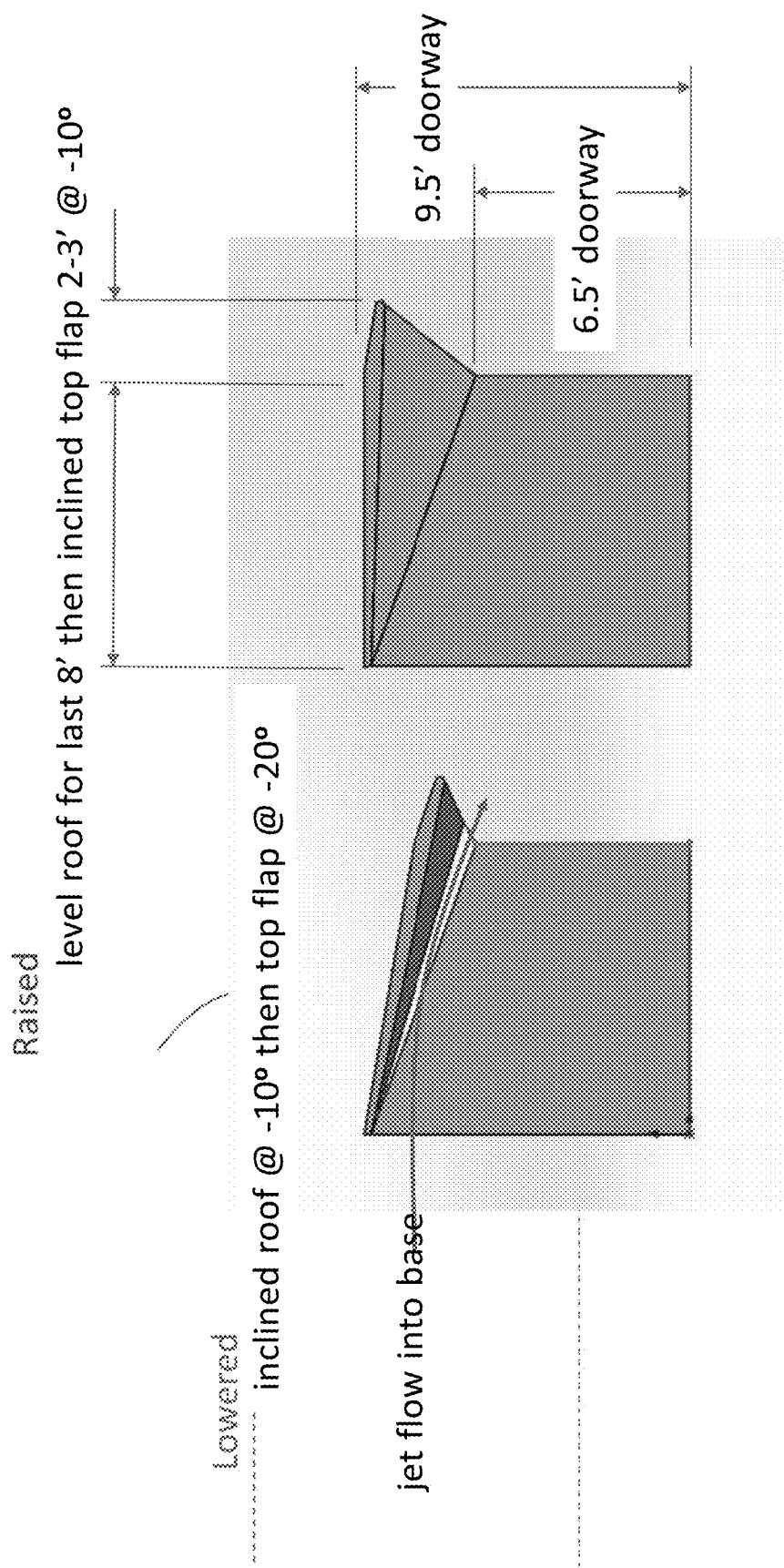
FIG. 3 on the previous page shows a close-up view as seen from the left side, for both states.

FIG. 3 shows a close-up view as seen from the left side, for both states. The hinged top panel and the pair of folding triangular sidewalls work in concert to redirect a portion of the exterior flow into the near wake, thereby reducing pressure drag. The novelty of the invention arises from the integrated manner in which a desirable aerodynamic effect is achieved by shaping the turbulent interaction between the air flow and the hinged top panel, the folding triangular sidewalls, and the three deployed rear doors, all the while making mechanical provisions devised to allow the seemingly rigid exterior cargo shell to be deployed then securely locked into either one of two states.

Figure 4:
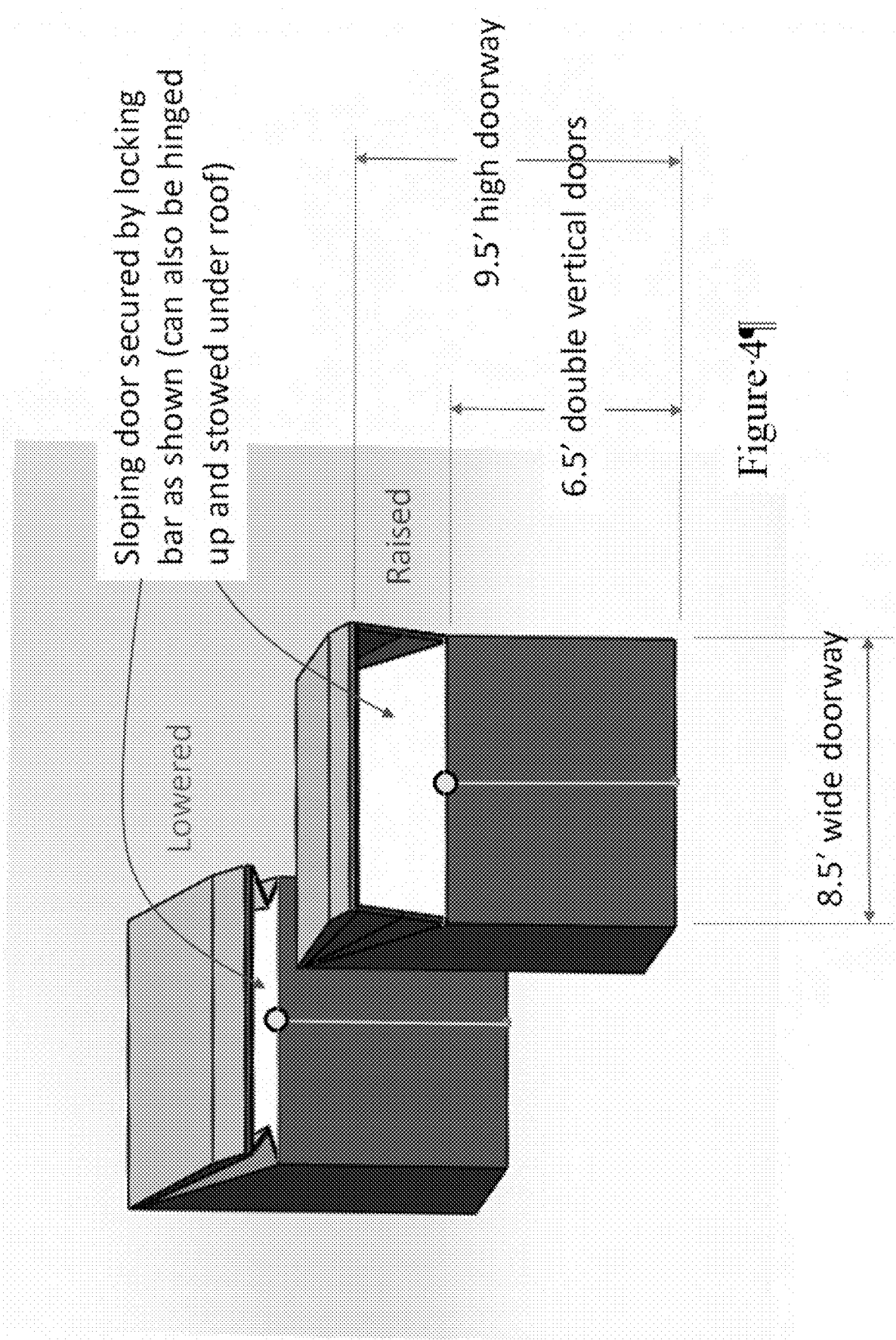
FIG. 4 shows the rear of the modified trailer as seen from the back.

FIG. 4 shows the rear of the modified trailer as seen from the back. The inward (or outward) folding of the triangular panel allows the top panel of the air deflection unit to be lowered (or raised) to best suit current requirements. In the preferred realization, the top panel incorporates an integrated top flap that projects 2-3' back beyond the vertical rear doors. In the lowered state, the top panel (roof or flap) are inclined down from the horizontal −10 degrees which effectively increases the downward inclination of the top flap to −20 degrees. The operation of the left and right triangular sidewall panels entails an inward/outward folding of a pair of suitably hinged triangular rigid panels. The invention is devised to allow the cargo space to be easily accessed via a rear doorway in the rear panel, of one of two heights, which can be opened or closed in one of two ways, via the deployment and mutual engagement of 3 of a total of 4 doors. In the raised state, the unobstructed full height doorway is devised to allow palletized loads to be rapidly handled dockside using one or more forklifts. The trailer has the same deck area and cubic capacity as a standard 53' box trailer and its rear doorway can be easily secured and locked using three vertical doors. In contrast, in the lowered state, the improved streamlining is sufficient to reduce fuel consumption >9% at highway speed, volumetric capacity is not meaningfully reduced and deck area is unchanged relative to a standard 53' trailer, and individual boxes can still be transferred in or out of a man-height doorway secured by two vertical doors engaged and locked to the inclined door as shown.

Figure 5:
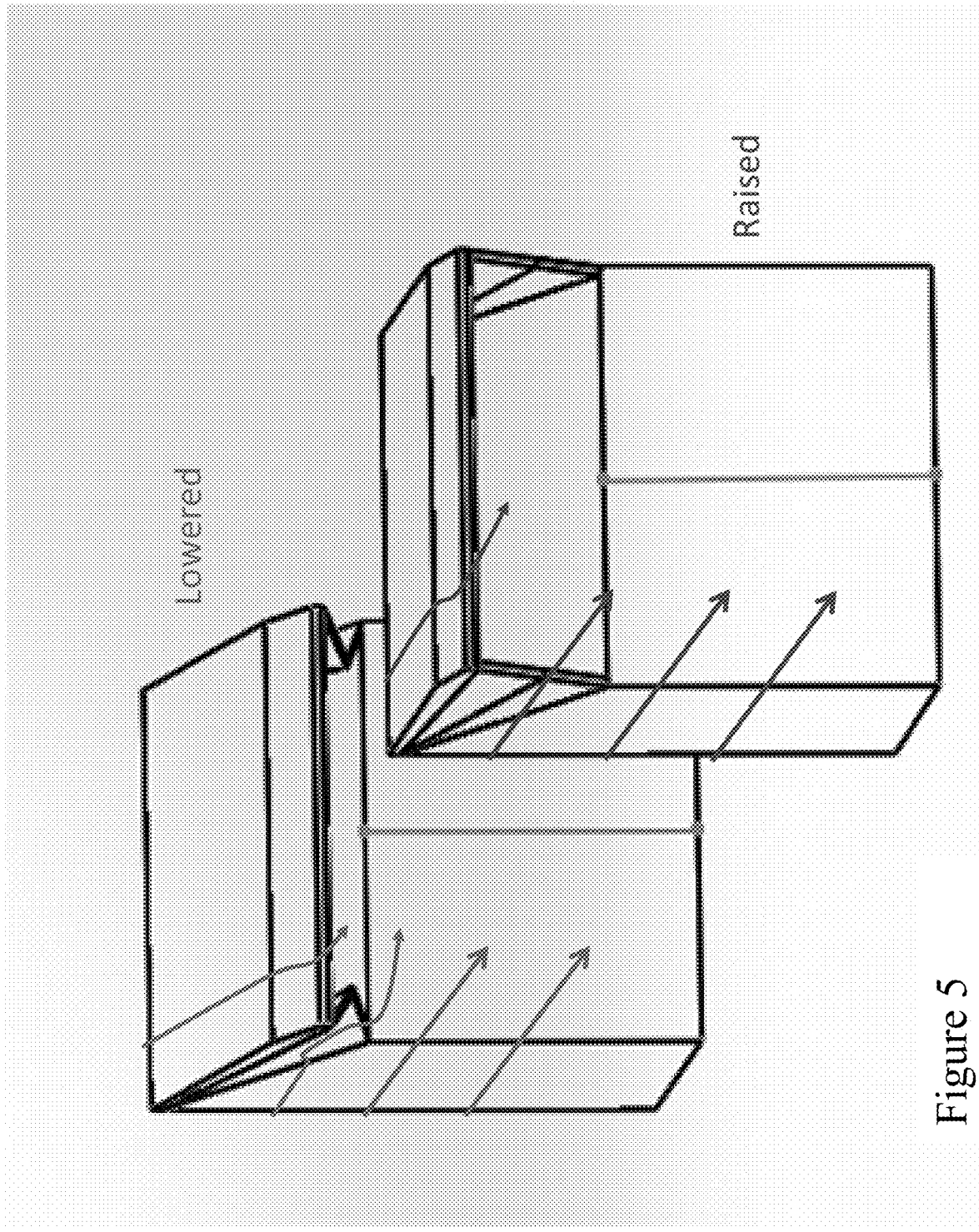
FIG. 5 shows the two possible states as viewed from the back with illustrative particle trajectories.

FIG. 5 shows the two possible states as viewed from the back with illustrative particle trajectories. Qualitatively, the bluff shape of the raised state results in massive separation just after the trailing edges, turbulent 3D recirculation within the near wake, and low base pressure, all contributing to high drag and high fuel consumption. In contrast, the streamlined lowered state helps redirect exterior flow into the near wake while top and side flaps (not shown) plus the confined cavity restrict recirculation and increase base pressure, all contributing to reduced drag and fuel consumption.

Figure 6:
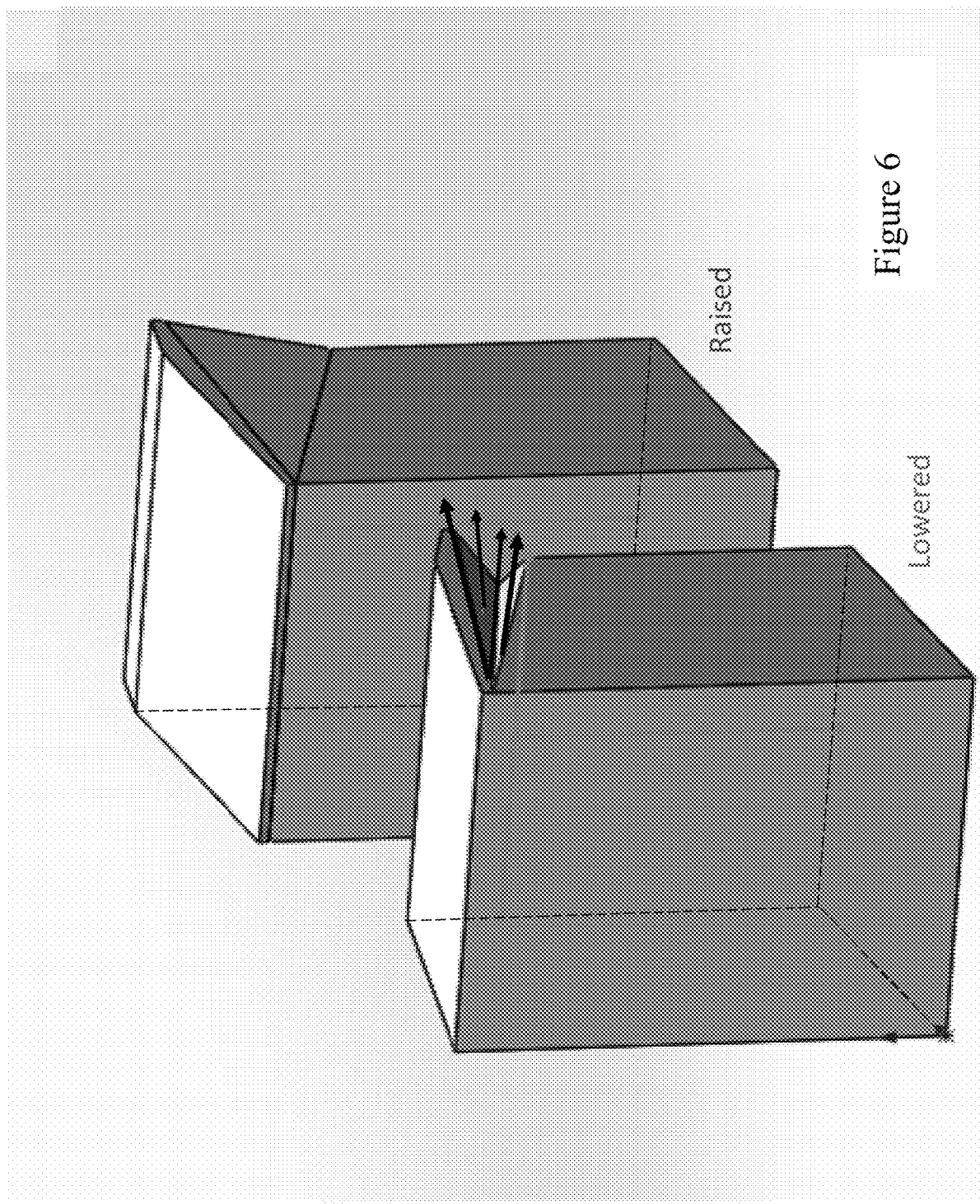
FIG. 6 shows the two configurations as seen from the left looking rearward and as if detached from the unmodified forward part of the trailer.

FIG. 6 shows the two configurations as seen from the left looking rearward and as if detached from the unmodified forward part of the trailer. The streamlines show the flow direction within an expanding channel in the upper sidewall which serves to direct a high speed jet flow into the near wake.

Figure 7:
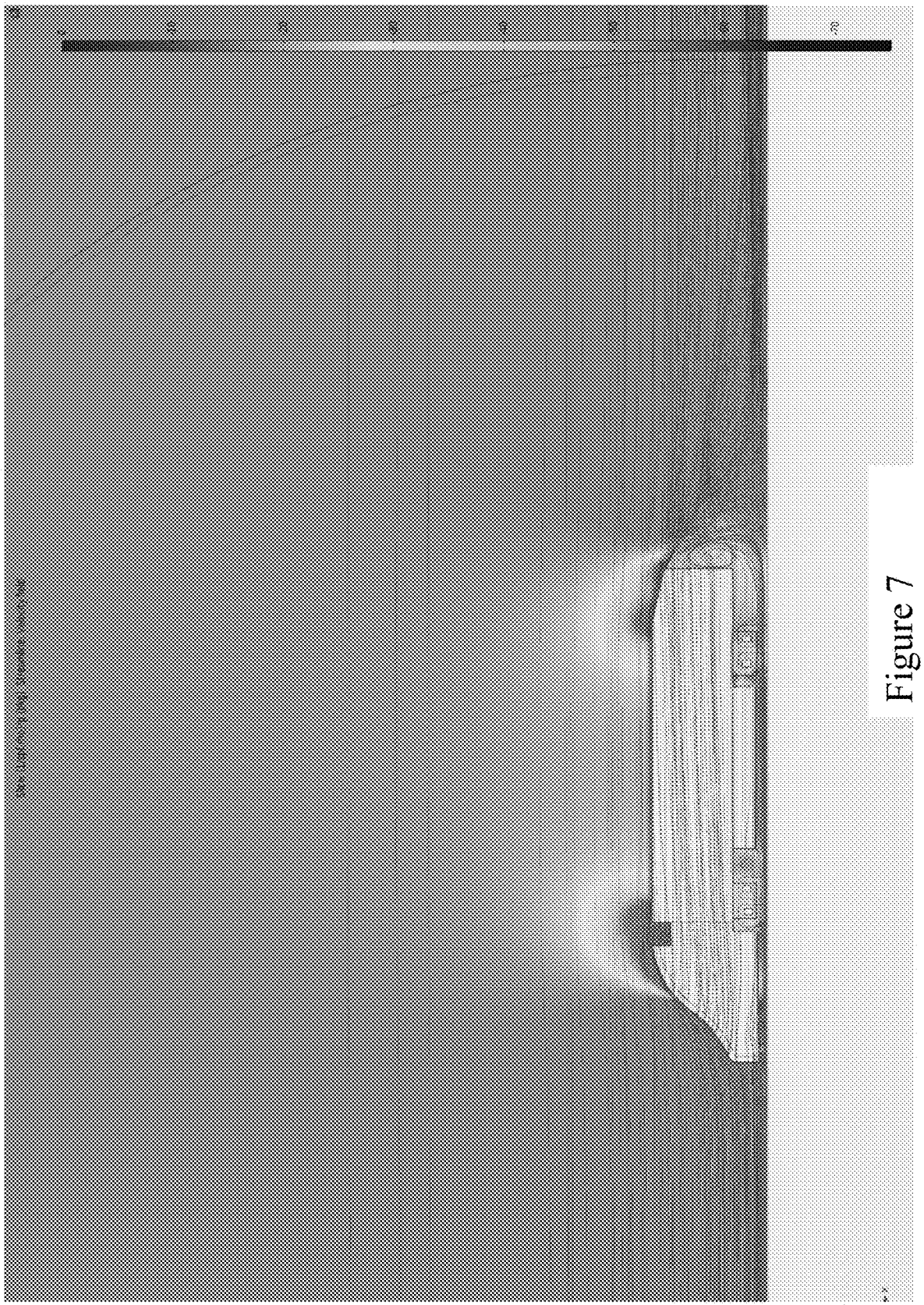
FIG. 7 shows an example of a Reynolds Averaged Navier-Stokes (RANS) turbulence simulation used to test and refine the present invention.

FIG. 7 is an example of a recent RANS turbulence simulation used to test and refine our invention. Pressure field and streamlines are shown in a plane just next to a finely detailed model tractor trailer. This COMSOL 5.2 simulation took >3 days using a DELL Intel Xeon 3.80 GHz processor w/32 GB RAM.

Figure 8:
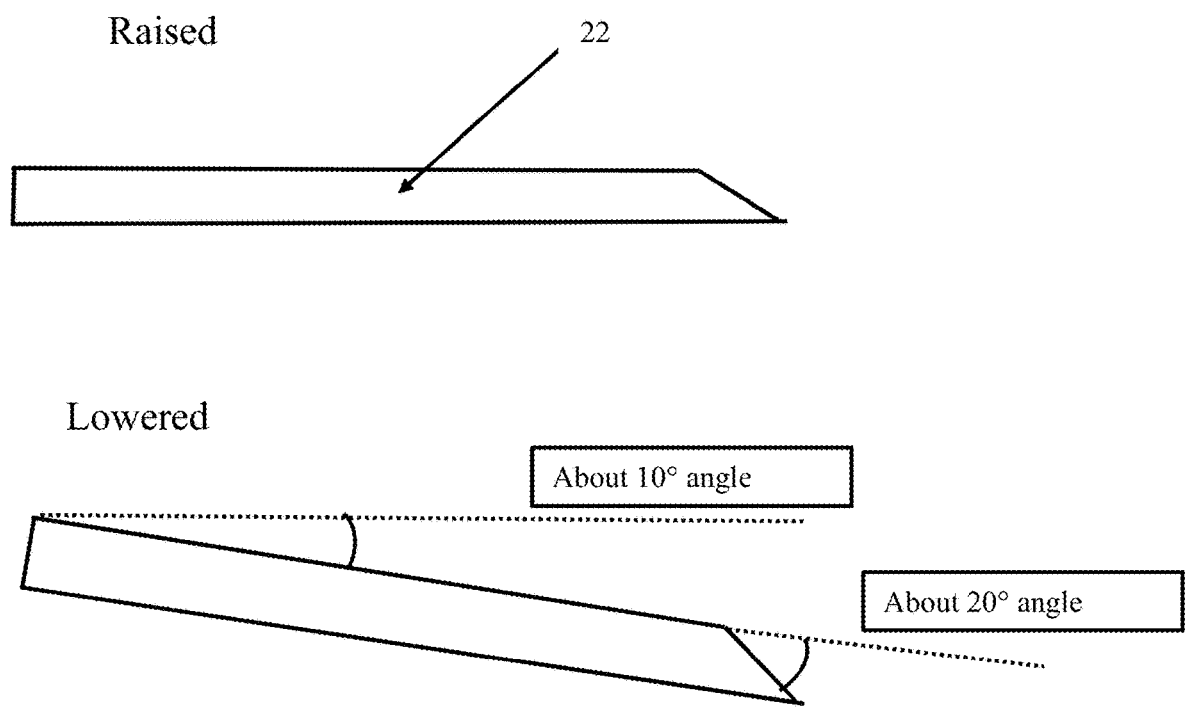
FIG. 8 shows a side-view of the top panel as shown in FIG. 4 wherein the angles are below the plane of the top surface of the truck or trailer.

FIG. 8 shows a side view of preferred configuration for the top panel (22) which provides for a flat surface with an angled extension to further direct the wind flow from the top of the surface to another angled flow to the back of the truck or trailer have a unit of the present invention installed thereon.

Figure 9:
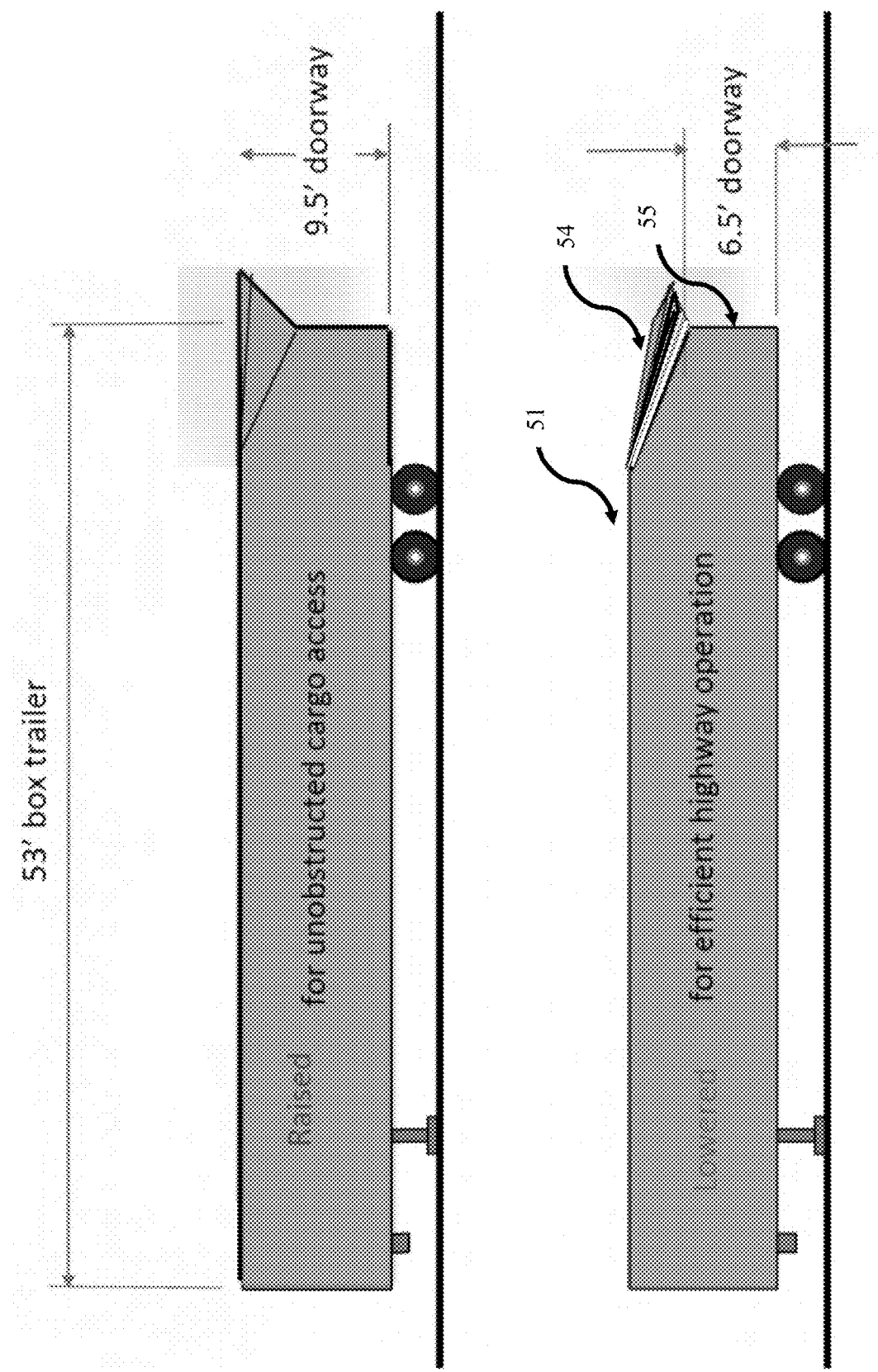
FIG. 9 shows a trailer configured in two states, i.e., 'Raised' or 'Lowered' wherein the air deflector is integrated into a new trailer.

FIG. 9 shows the trailer wherein the configured in two states, i.e., 'Raised' or 'Lowered'. The trailer can be hauled at any legal speed in either condition, and the cargo is always protected but easily accessible via full-height or man-height doorways, respectively.

Figure 10:
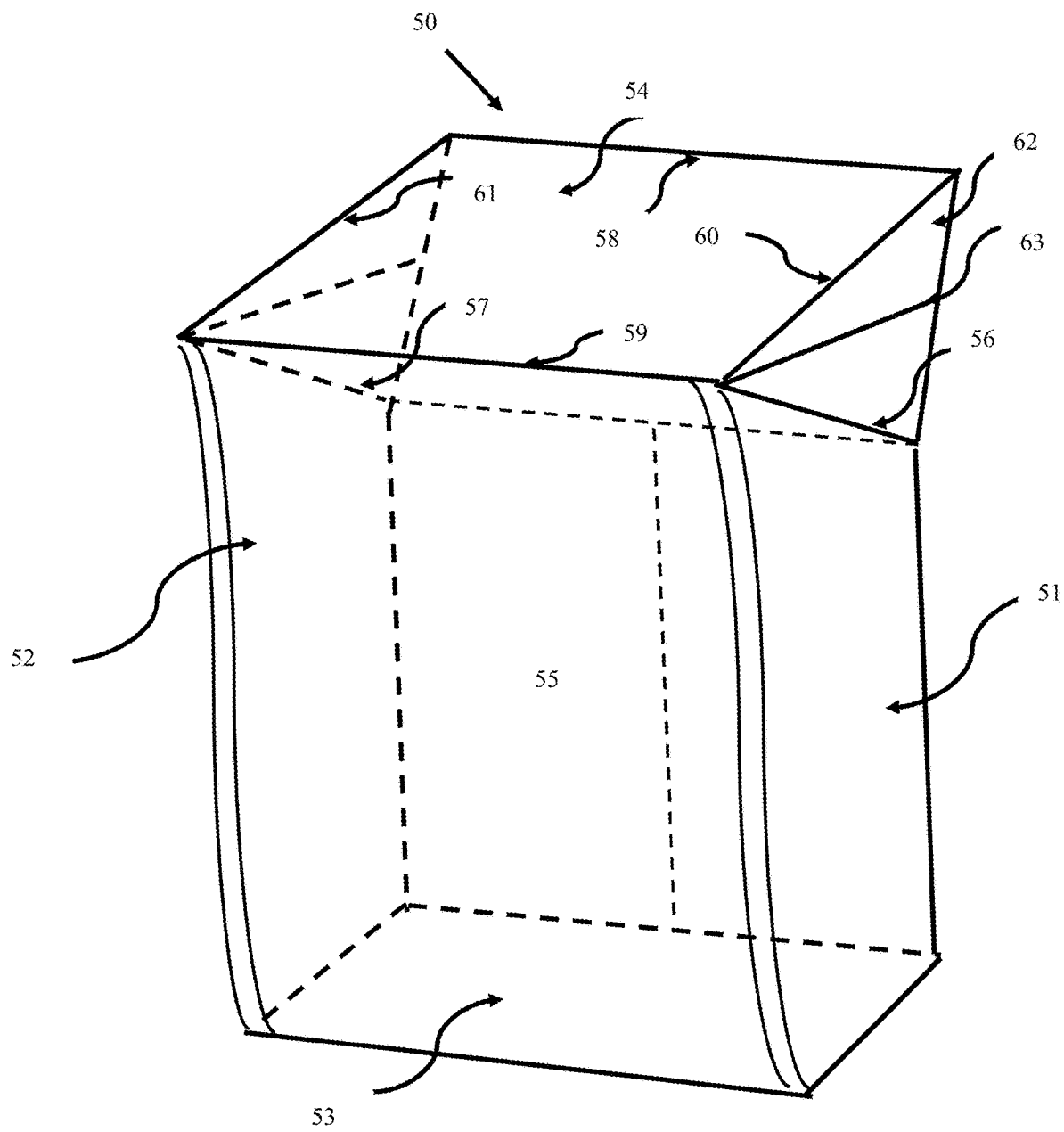
FIG. 10 shows a commercial trailer built with the rear end air deflector in raised configuration of the top panel with specific description of the construction parts.

FIG. 10 shows an air deflector (50) as part of the truck and extending rearwardly therefrom comprising:

a. a top panel (54) and a rear panel (55) attached to the first and second sidewall of the truck or trailer, wherein the first and second sidewall of the truck or trailer has a sloped top surface (56 and 57) having a length of about 5 to 10 feet long from the rear of the sidewalls with a sloped angle of about 7 to 20 degrees, and sloping away from the top surface of the truck or trailer, wherein the a top panel (54) having a first (60) and second side edge (61), front edge (58) and back (59) edge and communicatively connected to the top surface of the truck or trailer, wherein the top panel (54) is pivotally movable between a collapsed position adjacent to the sloped sidewalls of the truck or trailer and a deployed position extending upwardly generally parallel to the top surface of the truck or trailer edge to provide an opening the height of the truck or trailer, and wherein the end panel (55) comprises two doors attached to the first and second sidewalls of the truck or trailer, wherein the height of the two doors corresponds to that of the sloped first and second sidewalls and wherein the front edge (58) of the top panel (54), in the collapsed position, is adjacent and positioned near the end panel (55); and b. a first (62) and second (64) foldable triangular panel positioned and connected between the first side edge (60) and second side edge (61) of the top panel (54) and with the slopped section of the first and second sidewalls, wherein the first and second foldable triangular panels provide for the movement between the collapsed position and upward position of the top panel (54) and redirects wind flow to the back of the air deflector unit in a collapsed position.

Figure 11:
FIG. 11 shows a 1/14 scale control (tractor-trailer with no rear deflector) for comparison.

FIG. 11 shows 1/14 scale control (tractor-trailer with no rear deflector) mounted in high speed wind tunnel and test at up to 54 m/s (Re=700 k) over a range of wind yaw angles. These tests were established as a meaningful basis for comparison.

Figure 12:
FIG. 12 shows a 1/14 scale leading competitor (tractor-trailer fitted with 1/14 scale version of STEMCO's Trailer-Tail) mounted in high speed wind tunnel and tested under same conditions as control.

FIG. 12 shows a 1/14 scale leading competitor (tractor-trailer fitted with 1/14 scale version of STEMCO's Trailer-Tail) mounted in high speed wind tunnel and tested under same conditions as control. The associated reduction in drag due to the use of TrailerTail typically improves fuel consumption rates from a baseline value of 6.3 mpg (for control fitted with underbody skirts as shown in FIG. 11) to 6.7 mpg resulting in a fuel savings of ~6% but at a capital investment cost of ~$2800.

Figure 13:
FIG. 13 shows an early version of 1/14 scale model of presently claimed air deflector referred to as "TrimJET air deflector" or air flow management unit integrated into rear roof and upper side walls of standard 53' long box trailer.

FIG. 13 shows an early version of 1/14 scale model of presently claimed air deflector referred to as "TrimJET air deflector" or air flow management unit integrated into rear roof and upper side walls of standard 53' long box trailer and principally comprised of downward sloping rear roof panel, two inwardly folding upper side wall assemblies that direct jets of air into the low pressure base region, and two auxiliary flaps or air control panels used to trim or optimize the airflow patterns during operation in crosswinds. Based on wind tunnel comparisons to appropriate controls and reference configurations, the reduction in drag conferred by the use of TrimJET will exceed that conferred by the leading alternative tail treatment technology, i.e., TrailerTail, with the margin representing an additional fuel savings but again at the expense a comparable capital investment cost. However, in contrast to TrailerTail, which is a mere add-on which is easily damaged and has an expected life of 24-36 months, the claimed TrimJET is wholly integrated into the construction of the trailer's cargo container walls, does not project as far behind the rear doors, offers several alternative methods of doorway closure, and has an expected life of 10 years or more.

Figure 14:
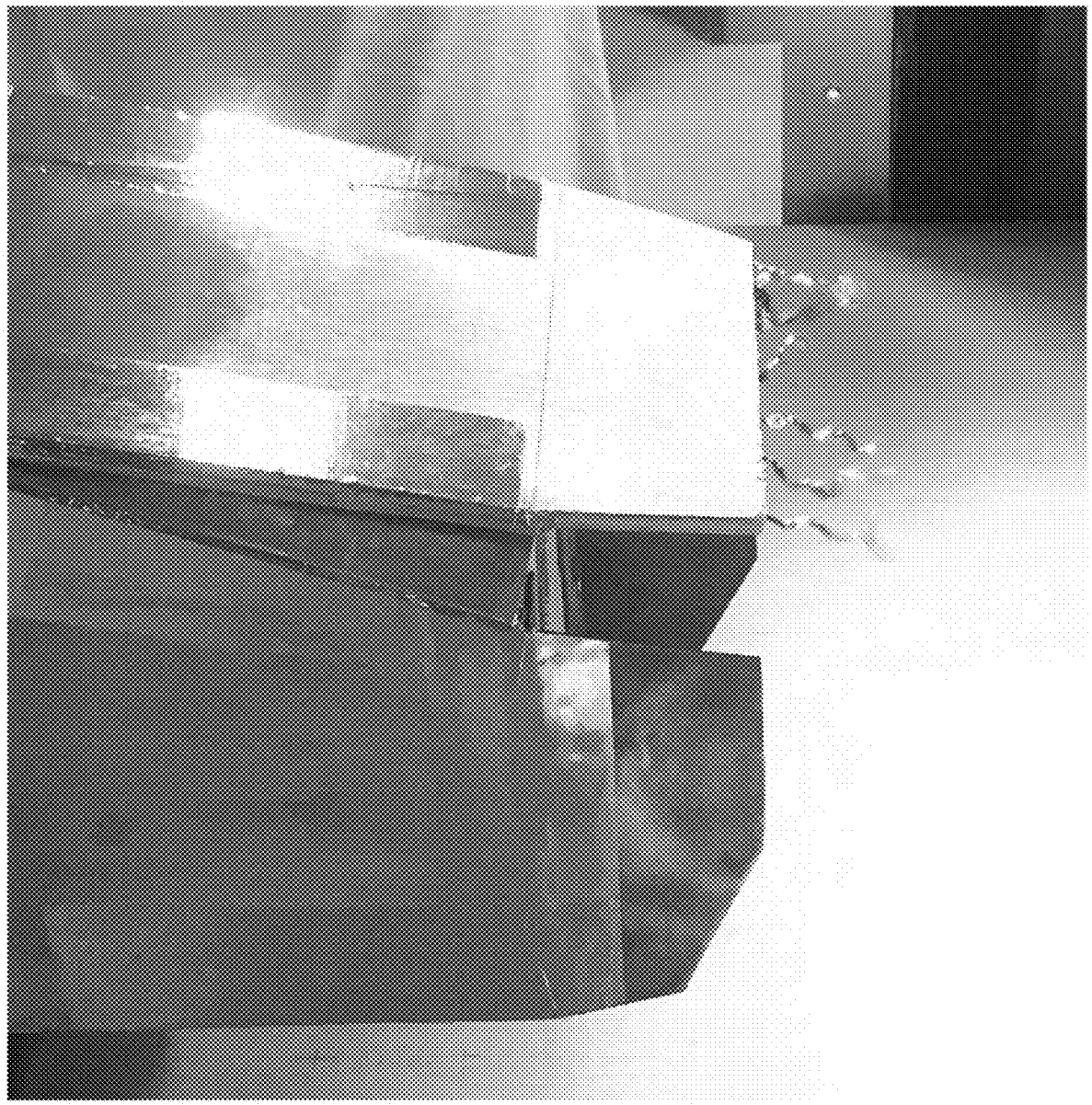
FIG. 14 shows the results of a series of flow visualization experiments conducted to quantify the mechanisms by which the inwardly folding upper side panels confer a novel, non-obvious and beneficial reduction in drag.

FIG. 14 shows the results of a series of flow visualization experiments conducted to quantify the mechanisms by which the inwardly folding upper side panels confer a non-obvious and beneficial reduction in drag. The photo was taken through a transparent side wall while the airflow over the model was moving at 50 m/s, a row of light weight yarns has been affixed to the trailing edge of the downwardly sloping rear roof panel to help visualize the flow conditions. Absent the expanding v-shaped channels, the yarns would be invisible due to high speed flutter induced by turbulent flow and separation just downstream of the trailing edge. Instead, as seen here, the yarns closest to the camera and those furthest from the camera are clearly visible indicating that the flow has remained laminar consistent with significantly reduced drag.

Figure 15:
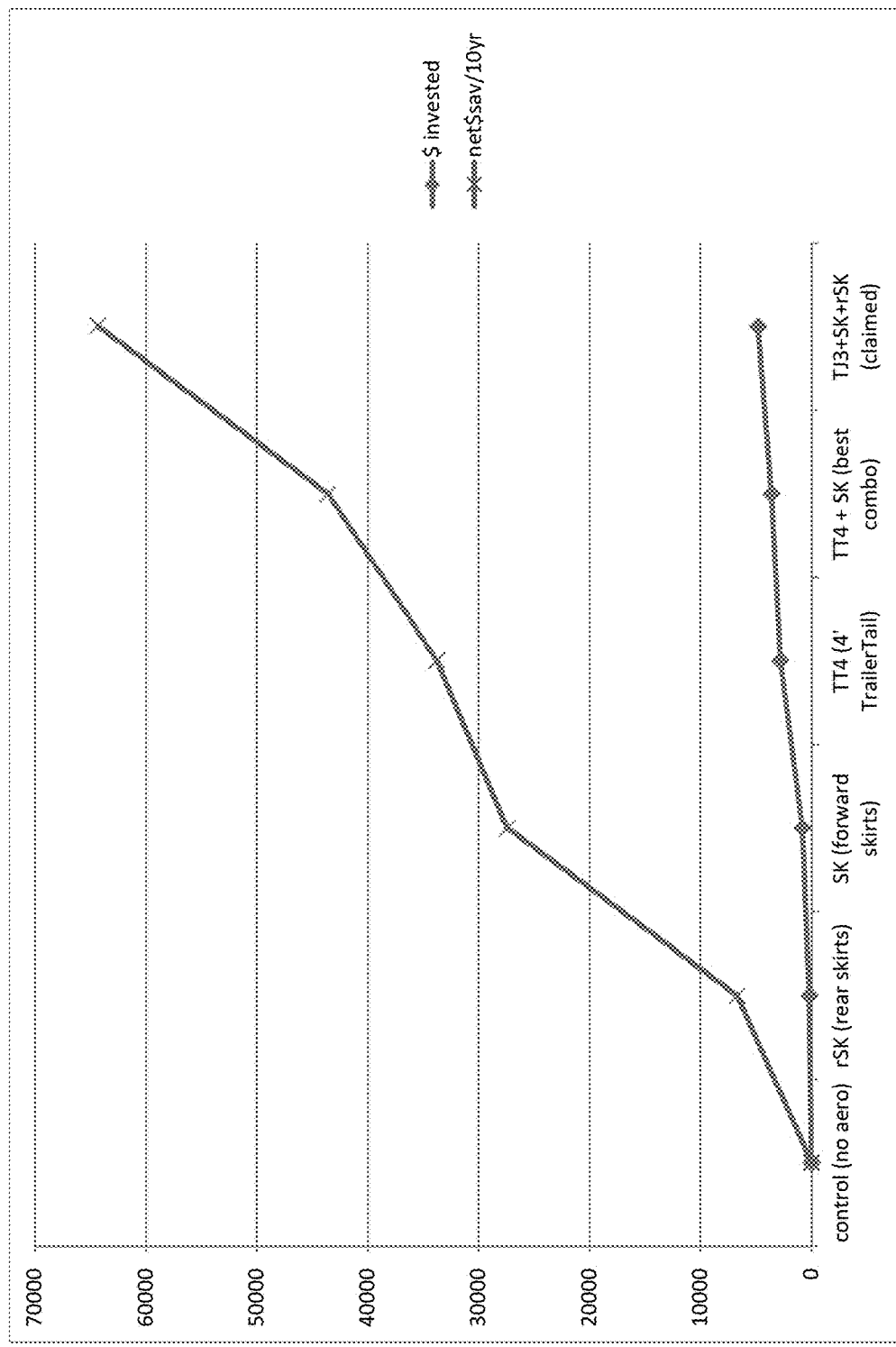
FIG. 15 shows experimental results obtained by wind tunnel testing over a range of wind yaw angles (i.e., to better simulate highway operation in cross winds).

FIG. 15 shows experimental results obtained by wind tunnel testing over a range of wind yaw angles (i.e., to better simulate highway operation in cross winds). A typical Class 7 commercial road vehicle consists of a streamlined tractor hauling a 53' long box trailer with a load capacity of 22.5 tons. The average trailer has a useful life of 2-3 decades and will be hauled 400,000 in the first decade at the cost of 67,000 gallons of fuel. Most trailers are unfaired but significant savings can be realized by installing equipment that improves trailer streamlining and reduces drag. The two curves shown a) the installed cost, and 2) the expected return-on-investment over a ten year period, for several types and combinations of equipment. In particular, the presently claimed TrimJET technology (i.e., item 6) will be more expensive to install but can provide a substantially higher cost savings, as compared to other alternatives, including 1) an untreated control, 2) & 3) two styles of underbody skirts, 4) a collapsible rear deflector called the TrailerTail, and 5) a combination of 3 and 4. In comparison to these existing add-on technologies, the presently claimed TrimJET technology is fully integrated into the structure of the cargo container, thereby improving its overall durability and exerting other positive effects on cargo transfers, driver workload, and vehicle safety.

Figure 16:
FIG. 16 shows show a 1/14 scale model of the presently claimed TrimJET technology in high speed wind tunnel test conducted at 54 m/s.

FIG. 16 shows show a 1/14 scale model of the presently claimed TrimJET technology in high speed wind tunnel test conducted at 54 m/s. In comparison to the leading alternative technology, the rear of the cargo container is significantly more streamlined and the air deflector unit does not project as far behind the rear doors. In the configuration pictured, the TrimJET is able to provide a larger reduction in drag than the TrailerTail (alternative technology) over a range of wind yaw angles which could be expected to reduce fuel consumption by a meaningful margin. The differential cost savings over a ten year period could easily exceed $20 k for a trailer being hauled 100 k miles per year.

Figure 17:
FIG. 17 shows the results of flow visualization experiment involving the application of titanium dioxide particles suspended in kerosene then immediate wind tunnel testing.

FIG. 17 shows the results of flow visualization experiment involving the application of titanium dioxide particles suspended in kerosene then immediate wind tunnel testing. The consequent evaporation of the kerosene results in visible evidence of particle trajectories on the surfaces of the exterior form of the model. This particular test confirmed that the side flap contour being tested was sub-optimal as evidenced by the absence of attached particles and an appropriate modification of the flap in conjunction with rescaling of the V-shaped jet channel achieved further beneficial reduction in tail drag.

Figure 18:
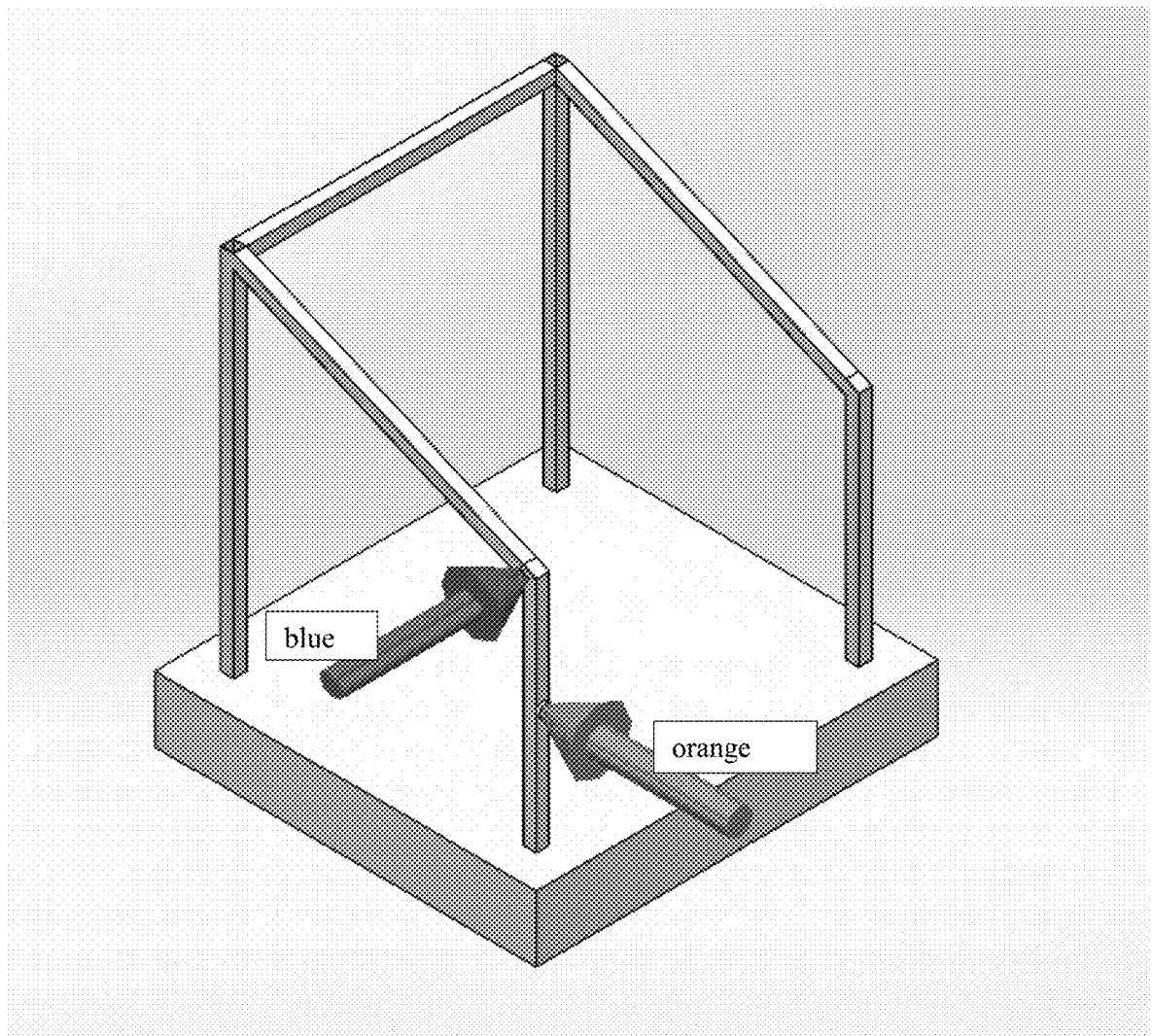
FIG. 18 shows a frame embodiment for inclusion within the truck or trailer for stabilizing the truck frame when the air deflector is integrated into the truck or added as an attachment.

FIG. 18 shows a frame embodiment for inclusion within the truck or trailer for stabilizing the truck frame when the air deflector is integrated into the truck or added as an attachment. Specifically it show one embodiment of a frame that extends backwards from a location 8' in front of the doors to the back of the trailer providing strength to the trailer especially to the unsupported length of the sidewalls from 53 to 46'. The blue arrow indicates the structural strength of the frame relating to the lateral load 10' above the road level and the orange arrow indicates the structure strength of the fore-aft load 7'-feet off the ground.

All of the above-described elements can be formed from any suitable material as would be known and appreciated in the art. For instance, steel, aluminum, DuraPlate, rigid plastics, fiberglass or the like can be utilized. Unless otherwise stated, the elements can include a smooth outline to further reduce drag. In addition, it should be appreciated that any suitable mounting hardware including common fasteners (such as nuts, bolts, or the like), latches, hooks, magnets, or the like, or any other conventional securing methods as would be known in the art can be utilized in connection with the present disclosure.

It should be understood and appreciated that various combinations of the above described subject matter are contemplated by the present disclosure. In addition, the teachings of the present disclosure can be incorporated into truck and trailer manufacture/sale as well as retrofit kits for upgrading existing trucks and trailers.

That which is claimed is:

1. An air deflector unit sized for integration into a truck or trailer, wherein the truck or trailer has exterior side walls, a storage area and a rear end, wherein the air deflector unit comprises a hinged rear roof or top panel communicatively connected to two inwardly folding upper sidewall panel assemblies and optionally two auxiliary control surfaces or flaps for deploying behind the air deflector unit integrated at the-rear end of the truck or trailer for directing air flow, and wherein a weather tight doorway system facilitates standard cargo operations and secure closure.

2. The air deflector unit according to claim 1, wherein the hinged roof panel in a lowered position has a downward slope of 14 to 15 degrees whereas the inwardly folding of the upper sidewall panel assemblies on both sides of the unit comprise an expanding V-shaped channel having a downward slope of 17 to 18 degrees, both angles providing for optimal air flow to behind the air deflector unit when the truck or trailer is moving at highway speeds.

3. The air deflector unit according to claim 1, wherein the air deflector unit also comprises two lower rear swinging doors that open outward and are accessible when the roof panel is in either the open or closed position.

4. The air deflector unit according to claim 1, comprising a larger doorway opening available only when the roof panel is in the raised position and the two lower rear swinging doors are open, thereby providing for one or more forklifts to access storage area of the truck or trailer without obstruction or interference.

5. An air deflector unit secured to and extending rearwardly from a truck or trailer, wherein the truck or trailer has a flat-box trailing end, a storage area with a height, a right and left sidewall surface, a top surface, and a lower or frame surface, the air deflector unit comprising:
    a first vertical side panel and a second vertical side panel attached to a bottom horizontal panel for connection to the left and right sidewall surface and the lower or frame surface of the truck or trailer; wherein the first vertical panel is configured having a first and second vertical edge, a bottom horizontal edge and a slopped top edge with a slope in the range of about −7 to −20 degrees from the plane of the top surface of the truck or trailer, spanning from the first vertical edge to the second vertical edge, wherein the second vertical panel is configured having a first and second vertical edge, a bottom horizontal edge and a slopped top edge with a slope of about −7 to −20 degrees and spanning from the first vertical edge to the second vertical edge;
    a top panel having a first and second side edge, front edge and back edge and communicatively connected to the top surface of the truck or trailer, wherein the top panel is pivotally movable between a collapsed position adjacent to the sloped top edge of the first vertical edge and second vertical edge and a deployed position extending upwardly generally parallel to the top surface of the truck or trailer edge to provide an opening the height of the truck or trailer;
    a first foldable triangular panel positioned and connected between the first side edge of the top panel and with the slopped top edge of the first vertical panel, a second foldable triangular panel positioned and connected between the second side edge of the top panel and with the slopped top edge of the second vertical panel, wherein the first and second foldable triangular panels provide for the movement between the collapsed position and upward position of the top panel and redirects wind flow to behind the air deflector unit in a collapsed position; and
    an end panel comprising two doors attached to the first vertical edge of the first and second side panels, wherein the two doors have a height of the first vertical edge of the first and second side panels and wherein the front edge of the top panel, in the collapsed position, is adjacent to the end panel.

6. An air deflector extending rearwardly from a truck or trailer, wherein the truck or trailer comprises a storage area with a height, a first and second sidewall and a top surface, the air deflector comprising:
    a top panel and a rear panel attached to the first and second sidewall of the truck or trailer, wherein the first and second sidewall of the truck or trailer has a sloped top surface having a length of about 5 to 10 feet long from the rear of the sidewalls with a sloped angle of about 7 to 20 degrees to form sloped side walls, sloping away from the top surface of the truck or trailer, wherein the a top panel having a first and second side edge, front edge and back edge and communicatively connected to the top surface of the truck or trailer, wherein the top panel is pivotally movable between a collapsed position adjacent to the sloped sidewalls of the truck or trailer and a deployed open position extending upwardly generally parallel to the top surface of the truck or trailer to provide an opening the height of the storage area of the truck or trailer.

7. The air deflector according to claim 6, wherein the slope of the top panel in the collapsed_position has an approximate slope of the two sidewalls of the truck or trailer, thereby providing for redirection of wind flow down the sloped angle when the truck or trailer is moving.

8. The air deflector according to claim 6, wherein the rear panel comprises two lower doors that open outward and are accessible when the top panel is in either the open or closed position.

9. The air deflector according to claim 8, comprising a third opening available when the top panel is in an open position and the two lower doors are open, thereby providing for accessing the height of storage area of the truck or trailer.

10. The air deflector according to claim 6 comprising two triangular foldable panels for connecting the top panel and each of the sloped sidewalls of the truck or trailer, where the triangular foldable panels actuate the opening and closing of the top panel.

11. The air deflector according to claim 6, wherein the top panel in a collapsed position is sloped away from the top surface of the truck or trailer in a downward position and-provides for directional movement of air flow to behind the air deflector as the truck or trailer is moving.

12. The air deflector according to claim 6, wherein the upper edge of the two side panels is sloped at an angle of about 10 degrees from the plane of the top surface of the truck or trailer.

13. The air deflector according to claim 6, wherein the top panel in an open position is in line with the top surface of the truck or trailer.

14. The air deflector according to claim 10, wherein each of the triangular panels comprises two similar rigid triangular pieces, wherein the rigid triangular pieces are hinged together so as to be movable between an open generally coplanar position and a closed position thereby allowing for the inward folding of the two ridged triangular pieces which defines an end space therebetween.

15. The air deflector according to claim 14, wherein the end space between the folding of the two ridged triangular pieces provides for directional flow of wind therebetween to behind the air deflector.

16. The air deflector according to claim 8, wherein the two lower doors of the rear panel of the unit comprises 6.5' high side-hinged vertical doors with deployable side flaps.

17. The air deflector according to claim 8, wherein a single 3' high top-hinged vertical door is stowed up under the top panel or available to seal cargo space within the truck or trailer by engaging and securing the upper edge of the two lower doors of the real panel.

18. The air deflector according to claim 6, wherein the top panel in a collapsed state extends beyond the rear panel.

19. An air deflector extending rearwardly from a truck or trailer, wherein the truck or trailer comprises a storage area with a height, a first and second sidewall and a top surface, the air deflector comprising:
a top panel and a rear panel attached to the first and second sidewall of the truck or trailer, wherein the first and second sidewall of the truck or trailer has a sloped top surface having a length of about 5 to 10 feet long with a sloped angle of about 7 to 20 degrees to provide first and second sloped sidewalls of the truck or trailer, sloping away from the top surface of the truck or trailer, wherein the a top panel having a first and second side edge, front edge and back edge and communicatively connected to the top surface of the truck or trailer, wherein the top panel is pivotally movable between a collapsed position adjacent to the sloped sidewalls of the truck or trailer and a deployed open position extending upwardly generally parallel to the top surface of the truck or trailer edge to provide an opening the height of the truck or trailer, and wherein the end panel comprises two doors attached to the first and second sidewalls of the truck or trailer, wherein the height of the two doors corresponds to that of the sloped first and second sidewalls and wherein the front edge of the top panel, in the collapsed position, is adjacent and positioned near the end panel;
a first and second foldable triangular panel positioned and connected between the first side edge and second side edge of the top panel and with the slopped section of the first and second sidewalls, wherein the first and second foldable triangular panels provide for the movement between the collapsed position and upward position of the top panel and redirects wind flow to behind the air deflector in a collapsed position.

20. An air deflector unit for attachment to a truck or trailer, the unit comprises two side panels communicatively connected to a bottom panel, a rear panel and a top panel, wherein each of the two side panels comprises an upper edge that is sloped at an angle in a range from about −7 to −20 degrees from the plane of a top surface of the truck or trailer to form sloped side panels, wherein the top panel is configured on a hinge mechanism to open and close and in a closed position rests on the rear panel and the sloped side panels of the unit.

21. The air deflector unit according to claim 20, wherein the top panel has a sloped angle in the closed position and has an approximate slope of the two sloped side panels, thereby providing for redirection of wind flow down the sloped angle when the truck or trailer is moving.

22. The air deflector unit according to claim 20, wherein the rear panel of the unit comprises two lower doors that open outward and are accessible when the top panel is in either the open or closed position.

23. The air deflector unit according to claim 22, comprising a third opening available when the top panel is in an open position and the two lower doors are open, thereby providing for accessing a storage area of the truck or trailer.

24. The air deflector unit according to claim 20, comprising two triangular foldable panels for connecting the top panel and each of the side panels, where the triangular foldable panels actuate the opening and closing of the top panel.

25. The air deflector unit according to claim 20, wherein the top panel in a closed state and sloped away from the truck or trailer and in a downward position provides for directional movement of air flow to behind the air deflector unit as the truck or trailer is moving.

26. The air deflector unit according to claim 20, wherein the upper edge of the two side panels is sloped at an angle of about −10 degrees from the plane of the top surface of the truck or trailer.

27. The air deflector unit according to claim 20, wherein the top panel in an open position is in line with the top surface of the truck or trailer.

28. The air deflector unit according to claim 20, wherein the air deflector unit comprising a rigid frame is fabricated from a durable material selected from a group consisting of a metal, aluminum, polymer, fiberglass and DuraPlate.

29. The air deflector unit according to claim 20, wherein the air deflector unit is installed and sealed into a pre-notched existing truck or trailer body.

30. The air deflector unit according to claim 24, wherein the triangular foldable panels comprise two similar rigid triangular pieces, wherein the rigid triangular pieces are hinged together so as to be movable between an open generally coplanar position and a closed position thereby allowing for inward folding of the two ridged triangular pieces which defines an end space therebetween.

31. The air deflector unit according to claim 30, wherein the end space between the inward folding of the two ridged triangular pieces provides for directional flow of wind therebetween to behind the air deflector unit.

32. The air deflector unit according to claim 20, wherein the truck or trailer has a flat-box trailing end.

33. The air deflector unit according to claim 20, wherein the two lower doors of the rear panel of the unit comprises 6.5' high side-hinged vertical doors with deployable side flaps.

34. The air deflector unit according to claim 22, wherein a single 3' high top-hinged vertical door is stowed up under the top panel or available to seal cargo space within the truck or trailer by engaging and securing to the upper edge of the two lower doors.

\* \* \* \* \*